US012165860B2

(12) United States Patent
Wildgoose

(10) Patent No.: US 12,165,860 B2
(45) Date of Patent: Dec. 10, 2024

(54) TWO DIMENSIONAL MS/MS ACQUISITION MODES

(71) Applicant: Micromass UK Limited, Wilmslow (GB)

(72) Inventor: Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 430 days.

(21) Appl. No.: 17/470,640

(22) Filed: Sep. 9, 2021

(65) Prior Publication Data

US 2021/0407780 A1 Dec. 30, 2021

Related U.S. Application Data

(63) Continuation of application No. 15/316,309, filed as application No. PCT/GB2015/000172 on Jun. 11, 2015, now Pat. No. 11,424,113.

(30) Foreign Application Priority Data

Jun. 11, 2014 (GB) .................................... 1410346
Sep. 4, 2014 (EP) .................................... 14183486

(51) Int. Cl.
*H01J 49/00* (2006.01)

(52) U.S. Cl.
CPC ........ *H01J 49/0027* (2013.01); *H01J 49/004* (2013.01); *H01J 49/0045* (2013.01)

(58) Field of Classification Search
None
See application file for complete search history.

(56) References Cited

U.S. PATENT DOCUMENTS

2005/0127287 A1* 6/2005 Plumb .................... G16B 40/00 250/281
2005/0127289 A1* 6/2005 Fuhrer .................. H01J 49/025 250/288

* cited by examiner

*Primary Examiner* — Xiaoyun R Xu
(74) *Attorney, Agent, or Firm* — Goodwin Procter LLP

(57) ABSTRACT

A method of mass spectrometry is disclosed comprising performing a plurality of experimental runs, wherein each experimental run comprises: periodically mass analysing fragment or product ions at a plurality of time intervals, wherein a delay time is provided between the start of the experimental run and the first time interval at which the fragment or product ions are mass analysed. Different delay times are provided in different ones of the experimental runs and fragment or product ions that have been analysed in the same time interval in at least one of said experimental runs and that have been analysed in different time intervals in at least one other of said experimental runs are identified as fragment or product ions of interest. These fragment or product ions are thus determined to relate to different precursor ions and are used to identify their respective precursor ions.

14 Claims, 4 Drawing Sheets

TWO DIMENSIONAL MS/MS ACQUISITION MODES

CROSS-REFERENCE TO RELATED APPLICATION

This application is a continuation of U.S. patent application Ser. No. 15/316,309, filed Dec. 6, 2016, which is a national phase filing claiming the benefit of and priority to International Patent Application No. PCT/GB2015/000172, filed Jun. 11, 2015, which claims priority from and the benefit of United Kingdom patent application No. 1410346.9 filed on Jun. 11, 2014 and European patent application No. 14183486.1 filed on Sep. 4, 2014. The entire contents of these applications are incorporated herein by reference.

BACKGROUND TO THE PRESENT INVENTION

It is known to employ Data Dependant Acquisitions ("DDA") on a tandem mass spectrometer, such as a quadrupole-Time of Flight mass spectrometer ("Q-ToF"). According to such known techniques, the mass to charge ratios of parent or precursor ions are determined in a survey scan. The quadrupole mass filter then sequentially isolates each individual parent or precursor ion according to its mass to charge ratio and accelerates it into a collision cell to produce product ions. The product ions are then mass analysed in the Time of Flight mass analyser. However, when the parent or precursor ions are isolated the other parent or precursor ions are discarded, leading to a low duty cycle. Furthermore, the parent or precursor ion selection according to this technique results in some bias. For example, if the 20 most intense precursor ions are selected this will bias the data towards the most abundant species.

An improvement on this approach was disclosed in U.S. Pat. No. 6,717,130 (Micromass), wherein precursor ions are not isolated and selected but fragment ions are assigned to parent ions by correlating their detection times to the times as which the parent species eluted from the chromatography column. This technique improves the duty cycle of the instrument and minimises biased acquisitions. However, the technique suffers from specificity limitations since at the point of fragmentation the parent ions are only separated from each other by chromatography.

A known mode of operation of a quadrupole-Time of Flight mass spectrometer is to operate the quadrupole mass filter in a low resolution mode with a transmission window of, for example, 25 Da. The mass to charge ratio range of the ions transmitted by the quadrupole mass filter is then sequentially incremented in steps of approximately 25 Da and in a manner that is not data dependant. Ions exiting the quadrupole mass filter are accelerated into a gas cell and the resulting fragment ions are mass analysed by the Time of Flight mass analyser. The data from each 25 Da window is kept separate for processing. This technique is un-biased in the nature of the acquisition and has an improved duty cycle over devices operating with narrower mass to charge ratio isolation windows. However, the technique has limited precursor ion specificity because any given fragment ion may belong to any of the precursor ions transmitted within a 25 Da window.

It is therefore desired to provide and improved method of mass spectrometry and an improved mass spectrometer.

SUMMARY OF THE PRESENT INVENTION

From a first aspect, the present invention provides a method of mass spectrometry comprising:

a) performing a plurality of experimental runs, wherein each experimental run comprises:

i) mass selectively transmitting precursor ions into a fragmentation or reaction device, wherein the mass to charge ratios of the precursor ions transmitted is varied as a function of time, ii) fragmenting or reacting the precursor ions in the fragmentation or reaction device so as to produce fragment or product ions, iii) periodically mass analysing the fragment or product ions at a plurality of time intervals, wherein a delay time is provided between the start of the experimental run and the first time interval at which the fragment or product ions are mass analysed;

b) providing different delay times in different ones of said experimental runs;

c) identifying a fragment or product ion that has been analysed in a first one of the time intervals in one of said experimental runs and that has been analysed in a different time interval in at least one other of said experimental runs as a fragment or product ion of interest;

d) using the timing of said first time interval and/or said different time interval to identify the respective precursor ion of the fragment or product ion of interest.

It is contemplated that the variation in time delay between experiments may be used to accurately analyse an ion. For example, an ion of one species may be analysed in one time interval in a first experimental run having a first delay time, but may be analysed in a different time interval in a different experimental run having a different delay time. The timings of the different time intervals may then be used to accurately analyse the ion species.

For example, the timings of the first time interval and the different time interval may be averaged to determine an average timing that is then used to identify the precursor ion of the fragment or product ion of interest. Alternatively, an ion signal intensity weighted value (e.g. centroid value) of the timings may be determined and then used to identify the precursor ion of the fragment or product ion of interest.

Said first one of the time intervals and said different time interval may be adjacent time intervals.

Step c) of the method may comprise identifying fragment or product ions that have been analysed in the same time interval in at least one of said experimental runs and that have also been analysed in different time intervals in at least one other of said experimental runs as fragment or product ions of interest, and determining that these fragment or product ions relate to different precursor ions. Step d) of the method may then comprise using the timings of said different time intervals to identify the respective precursor ions of the fragment or product ions of interest. Said different time intervals may be adjacent time intervals.

As the delay times are varied, fragment or product ions that exit the fragmentation or reaction device at a similar time can be analysed in different time intervals. This enables the times at which their respective precursor ions were transmitted to be identified more accurately and hence the mass to charge ratios of the precursor ions can be identified more accurately, since the mass to charge ratios of the precursor ions transmitted is varied as a function of time.

The fragment or product ions of interest may be analysed in the same time interval in at least one of said experimental runs and may be analysed in different time intervals in at least one other of said experimental runs.

The method may comprise determining the duration of time between the start of an experimental run and the timing of the time interval at which each of said fragment or product ions of interest is detected, and using each said duration of time to determine the mass to charge ratio of the respective precursor ion of the ion of interest. The experimental run is one in which the fragment ions of interest are analysed at different time intervals.

A first fragment or product ion of interest may be analysed at a first time interval and may be determined to relate to a first precursor ion, wherein the timing of the first time interval is used to determine the time at which the first precursor ion was transmitted into the fragmentation or reaction device, and wherein the time at which the first precursor ion was transmitted is used to determine the mass to charge ratio of the first precursor ion. Alternatively, or additionally, a second, different fragment or product ion of interest may be analysed at a second time interval and determined to relate to a second, different precursor ion, wherein the timing of the second time interval is used to determine the time at which the second precursor ion was transmitted into the fragmentation or reaction device, and wherein the time at which the second precursor ion was transmitted is used to determine the mass to charge ratio of the second precursor ion.

The method may comprise summing the mass spectral data from said plurality of experimental runs.

Each experimental run may comprise analysing ions at a plurality of N time intervals after the start of the experimental run, and spectral data from the plurality of experimental runs may summed to provide composite spectral data having N time intervals, wherein the nth time interval of the composite spectral data includes the spectral data from the nth time interval of each of the experimental runs.

Said fragment or product ions of interest may be determined to be ions having spectral data in different time intervals of said composite spectral data.

Said fragment or product ions of interest may also have spectral data in the same time interval of said composite spectral data.

Different fragment or product ions of interest may have different mass to charge ratios.

The fragment or product ions may be analysed by a time of flight mass analyser that periodically pulses the fragment or product ions into a time of flight region, and the durations between subsequent ones of said pulses may correspond to said plurality of time intervals.

The precursor ions may be mass selectively transmitted to the fragmentation of reaction device by a mass filter or quadrupole rod set.

The step of providing different delay times in different ones of said experimental runs may comprise providing either random delay times or predetermined different delay times.

From a second aspect, the present invention provides a method of mass spectrometry comprising:

a) performing a plurality of experimental runs, wherein each experimental run comprises:
i) transmitting precursor ions into a fragmentation or reaction device, wherein a physicochemical property of the precursor ions transmitted is varied as a function of time,
ii) fragmenting or reacting the precursor ions in the fragmentation or reaction device so as to produce fragment or product ions,
iii) periodically mass analysing the fragment or product ions at a plurality of time intervals, wherein a delay time is provided between the start of the experimental run and the first time interval at which the fragment or product ions are mass analysed;
b) providing different delay times in different ones of said experimental runs;
c) identifying a fragment or product ion that has been analysed in a first one of the time intervals in one of said experimental runs and that has been analysed in a different time interval in at least one other of said experimental runs as a fragment or product ion of interest; and
d) using the timings of said first time interval and/or said different time interval to identify the respective precursor ion of the fragment or product ion of interest.

Step c) may comprise identifying fragment or product ions that have been analysed in the same time interval in at least one of said experimental runs and that have also been analysed in different time intervals in at least one other of said experimental runs as fragment or product ions of interest, and determining that these fragment or product ions relate to different precursor ions. Step d) may comprise using the timings of said different time intervals to identify the respective precursor ions of the fragment or product ions of interest. Said different time intervals may be adjacent time intervals.

Step c) optionally consists of identifying fragment or product ions that have been analysed in the same time interval in at least one of said experimental runs and that have been analysed in different time intervals in at least one other of said experimental runs as the fragment or product ions of interest, and determining that these fragment or product ions relate to different precursor ions.

The precursor ions may transmitted to said fragmentation or reaction device by an ion mobility separator, and said physicochemical property may be ion mobility.

The time intervals described herein may be regular time intervals.

The method according to the second aspect may have any of the optional features associated with the first aspect of the invention, except wherein the precursor ions are not necessarily selectively transmitted according to their mass to charge ratio, but may be selectively transmitted by another physicochemical property.

For example, the method may comprise determining the duration of time between the start of an experimental run and the timing of the time interval at which each of said fragment or product ions of interest is detected, and using each said duration of time to determine the value of the physicochemical property (e.g. ion mobility) of the respective precursor ion of the ion of interest. The experimental run is one in which the fragment ions of interest are analysed at different time intervals.

A first fragment or product ion of interest may be analysed at a first time interval and determined to relate to a first precursor ion, wherein the timing of the first time interval is used to determine the time at which the first precursor ion was transmitted into the fragmentation or reaction device, and wherein the time at which the first precursor ion was transmitted is used to determine the value of the physicochemical property of the first precursor ion. Alternatively, or additionally, a second, different fragment or product ion of interest may be analysed at a second time interval and may be determined to relate to a second, different precursor ion, wherein the timing of the second time interval is used to determine the time at which the second precursor ion was transmitted into the fragmentation or reaction device, and wherein the time at which the second precursor ion was transmitted is used to determine the physicochemical property value of the second precursor ion.

The present invention also provides a mass spectrometer arranged and configured to perform any one of the methods described herein.

According to the first aspect of the present invention, there is provided a mass spectrometer comprising:

a device for mass selectively transmitting ions;

a fragmentation or reaction device;

a mass analyser; and control means arranged and configured to cause the mass spectrometer to perform a plurality of experimental runs, wherein each experimental run comprises:

i) mass selectively transmitting precursor ions through said device and into the fragmentation or reaction device, wherein the mass to charge ratios of the precursor ions transmitted is varied as a function of time, ii) fragmenting or reacting the precursor ions in the fragmentation or reaction device so as to produce fragment or product ions, iii) periodically mass analysing the fragment or product ions in the mass analyser at a plurality of time intervals, wherein a delay time is provided between the start of the experimental run and the first time interval at which the fragment or product ions are mass analysed;

said control means being further arranged and configured to:

provide different delay times in different ones of said experimental runs;

identify a fragment or product ion that has been analysed in a first one of the time intervals in one of said experimental runs and that has been analysed in a different time interval in at least one other of said experimental runs as a fragment or product ion of interest; and use the timings of said first time interval and/or said different time interval to identify the respective precursor ions of the fragment or product ion of interest.

The step of identify a fragment or product ion may comprise identifying fragment or product ions that have been analysed in the same time interval in at least one of said experimental runs and that have also been analysed in different time intervals in at least one other of said experimental runs as fragment or product ions of interest, and determining that these fragment or product ions relate to different precursor ions. The step of using the timings of said first time interval and/or said different time interval may comprise using the timings of said different time intervals to identify the respective precursor ions of the fragment or product ions of interest. Said different time intervals may be adjacent time intervals.

Optionally, the step of identifying fragment or product ions of interest comprises identifying fragment or product ions that have been analysed in the same time interval in at least one of said experimental runs and that have been analysed in different time intervals in at least one other of said experimental runs as fragment or product ions of interest.

According to the second aspect of the present invention, there is provided a mass or ion mobility spectrometer comprising:

a device for selectively transmitting ions according to a physicochemical property;

a fragmentation or reaction device;

a mass analyser; and control means arranged and configured to cause the mass spectrometer to perform a plurality of experimental runs, wherein each experimental run comprises:

i) transmitting precursor ions through said device and into the fragmentation or reaction device, wherein a physicochemical property of the precursor ions transmitted is varied as a function of time, ii) fragmenting or reacting the precursor ions in the fragmentation or reaction device so as to produce fragment or product ions, iii) periodically mass analysing the fragment or product ions in the mass analyser at a plurality of time intervals, wherein a delay time is provided between the start of the experimental run and the first time interval at which the fragment or product ions are mass analysed;

said control means being further arranged and configured to:

provide different delay times in different ones of said experimental runs;

identify a fragment or product ion that has been analysed in a first one of the time intervals in one of said experimental runs and that has been analysed in a different time interval in at least one other of said experimental runs as a fragment or product ion of interest; and use the timings of said first time interval and/or said different time interval to identify the respective precursor ions of the fragment or product ion of interest.

The step of identify a fragment or product ion may comprise identifying fragment or product ions that have been analysed in the same time interval in at least one of said experimental runs and that have also been analysed in different time intervals in at least one other of said experimental runs as fragment or product ions of interest, and determining that these fragment or product ions relate to different precursor ions. The step of using the timings of said first time interval and/or said different time interval may comprise using the timings of said different time intervals to identify the respective precursor ions of the fragment or product ions of interest. Said different time intervals may be adjacent time intervals.

Optionally, the step of identifying fragment or product ions of interest comprises identifying fragment or product ions that have been analysed in the same time interval in at least one of said experimental runs and that have been analysed in different time intervals in at least one other of said experimental runs as fragment or product ions of interest.

From a third aspect, the present invention provides a method of mass spectrometry comprising:

mass selectively transmitting precursor ions into a fragmentation or reaction device, wherein the mass to charge ratios of the precursor ions transmitted is varied as a function of time;

fragmenting or reacting the precursor ions in the fragmentation or reaction device so as to produce fragment or product ions;

periodically mass analysing the fragment or product ions at a plurality of consecutive time intervals;

wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;

wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;

wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;

determining a peak for each of the different fragment or product ions including at least the first, second and third summed intensities represented as a function of their associated first T1, second T2 and third T3 times;

determining an average or centroid time value for each peak that represents an average or centroid time at which the fragment or product ion is considered to have been analysed; and using the average or centroid time for each fragment or product ion to identify its respective precursor ion.

This method enables the amount of data acquired to be reduced. For example, ideally the data from each of the pushes would be kept separate by having a sampling rate that is the same as the time interval rate. However, such rates would result in a vast amount of data. This approach enables a reduced number of data points and reduced file sizes, whilst retaining the ability to resolve fragment ions and use them to identify their precursor ions.

WO 2013/171459 discloses using the start and end times at which a fragment ion is detected to determine the start and end times at which its precursor ion appears. This enables overlapping parent ion spectra to be resolved in cases where the fragment ions relating to these parent ions do not overlap. However, WO'459 does not disclose summing the intensities of spectral data for a plurality of consecutive time intervals, for each fragment ion, to determine a summed intensity for each fragment ion and associating it with a time value. Consequently, this document does not disclose repeating this process for at least a second plurality of consecutive time intervals and a third plurality of consecutive time intervals. Therefore, this document does not disclose determining a peak from this data, a centroid of such a peak, and using such a centroid to identify an ion. It would not be obvious to sum the fragment ion data in WO'459 to provide summed outputs at fewer time intervals, because the teaching of that invention is to accurately identify the start and end times at which different fragments are detected, so that their overlapping parent ions can be resolved. Furthermore, even if such data was summed and a peak formed, as required by the third aspect of the present invention, an average or centroid time value for the fragment peak would not be determined, as WO'459 is interested in identifying the start and end times of the fragment peak in order to identify the corresponding start and end times of its respective parent ion.

US 2011/186727 discloses reducing the data throughput from an ADC to a main processor by summing high intensity measurements from different T0F extractions before transmission to the main processor. However, such data summing techniques would not be used in WO 2013/171459 for the reasons discussed above. Furthermore, US 2011/186727 does not disclose that for each type of ion, the intensities of the spectral data obtained in a first plurality of respective time intervals between T0 and T1 is summed, i.e. in consecutive time intervals. This document also does not disclose summing data in a time period immediately following T1, i.e. from T1 to T2. This document also does not disclose summing data in a time period immediately following T2, i.e. from T2 to T3. Consequently, US 2011/186727 does not determine a peak for each type of ion including the summed intensities at T1, T2 and T3, or determining the average or centroid value of such a peak. This is because, although US 2011/186727 seeks to reduce data throughput by summing some of the data, this document is not concerned with how to reduce data whilst still resolving a peak, e.g. as described in relation to FIG. 6 of the present application. As such, US 2011/186727 does not sum the data over consecutive time periods T0-T1, T1-T2, T2-T3, and then form a peak from these summed values, and then determine the centroid or average value of such a peak.

According to the present method, the average or centroid time for a first of said different fragment or product ions may be used to determine the time at which its precursor ion was transmitted into the fragmentation or reaction device, and the time at which its precursor ion was transmitted may be used to determine the mass to charge ratio of the precursor ion. Alternatively, or additionally, the average or centroid time for a second of said different fragment or product ions may be used to determine the time at which its precursor ion was transmitted into the fragmentation or reaction device, and the time at which its precursor ion was transmitted may be used to determine the mass to charge ratio of the precursor ion.

A first of said different fragment or product ions may be mass analysed during a plurality of first consecutive time intervals, and a second of said different fragment or product ions may be mass analysed during a plurality of second consecutive time intervals, and the first and second consecutive time intervals may partially overlap such that some of the time intervals in the first and second consecutive time intervals are the same time intervals and some of the time intervals in the first and second consecutive time intervals are non-overlapping time intervals.

Optionally, said first plurality of consecutive time intervals occurring between said start time T0 and said first time T1 includes at least some of said same time intervals and at least some of said non-overlapping time intervals.

Alternatively, or additionally, said second plurality of consecutive time intervals occurring between said first time T1 and said second time T2 includes at least some of said same time intervals and/or at least some of said non-overlapping time intervals; and/or Alternatively, or additionally, said third plurality of consecutive time intervals occurring between said second time T2 and said third time T3 includes at least some of said same time intervals and/or at least some of said non-overlapping time intervals.

For each of the different types of fragment or product ions, the intensities of the spectral data obtained in a fourth plurality of consecutive time intervals occurring between the third time T3 and a fourth later time T4 may be summed so as to determine a fourth summed intensity for each fragment or product ion that is associated with fourth time T4; and said step of determining a peak may comprise determining a peak for each of the different fragment or product ions including the first, second, third and fourth summed intensities represented as a function of their associated first T1, second T2, third T3 and fourth T4 times.

The fourth plurality of consecutive time intervals occurring between said third time T3 and said fourth time T4 includes at least some of said same time intervals and/or at least some of said non-overlapping time intervals.

Further pluralities of consecutive time intervals occurring between different time ranges may be summed so as to determine further respective summed intensities for fragment or product ions that are associated with further times. The step of determining a peak may comprise determining a peak for each of the different fragment or product ions including the first, second, third, fourth and further summed intensities represented as a function of their associated times.

The step of determining an average or centroid time value for each peak may comprise determining a weighted average time of said peak.

Said first and/or second and/or third and/or fourth and/or further plurality of consecutive time intervals may comprise ≥x time intervals, wherein x is selected from the group consisting of: 2, 3, 4, 5, 6, 7, 8, 9, 10. 15 or 20.

The time intervals may be regular time intervals.

Said different fragment or product ions may have different mass to charge ratios.

The fragment or product ions may be analysed by a time of flight mass analyser that periodically pulses the fragment or product ions into a time of flight region, and the durations between subsequent ones of said pulses may correspond to said plurality of time intervals.

The precursor ions may be mass selectively transmitted to the fragmentation of reaction device by a mass filter or quadrupole rod set.

From a fourth aspect, the present invention provides a method of mass or ion mobility spectrometry comprising:

- transmitting precursor ions into a fragmentation or reaction device, wherein a physicochemical property of the precursor ions transmitted is varied as a function of time
- fragmenting or reacting the precursor ions in the fragmentation or reaction device so as to produce fragment or product ions;
- periodically mass analysing the fragment or product ions at a plurality of consecutive time intervals;
- wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;
- wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;
- wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;
- determining a peak for each of the different fragment or product ions including at least the first, second and third summed intensities represented as a function of their associated first T1, second T2 and third T3 times;
- determining an average or centroid time value for each peak that represents an average or centroid time at which the fragment or product ion is considered to have been analysed; and
- using the average or centroid time for each fragment or product ion to identify its respective precursor ion.

The precursor ions may be transmitted to said fragmentation or reaction device by an ion mobility separator, and said physicochemical property may be ion mobility.

The method according to the fourth aspect may have any of the optional features associated with the third aspect of the invention, except wherein the precursor ions are not necessarily selectively transmitted according to their mass to charge ratio, but may be selectively transmitted by another physicochemical property.

For example, the average or centroid time for a first of said different fragment or product ions may be used to determine the time at which its precursor ion was transmitted into the fragmentation or reaction device, and the time at which its precursor ion was transmitted maybe used to determine the physicochemical property value of the precursor ion. Alternatively, or additionally, the average or centroid time for a second of said different fragment or product ions may be used to determine the time at which its precursor ion was transmitted into the fragmentation or reaction device, and the time at which its precursor ion was transmitted may be used to determine the physicochemical property value of the precursor ion.

The third aspect of the present invention also provides a mass spectrometer comprising:

- a device for mass selectively transmitting ions;
- a fragmentation or reaction device;
- a mass analyser; and
- control means arranged and configured to cause the mass spectrometer to mass selectively transmit precursor ions through said device and into the fragmentation or reaction device, wherein the mass to charge ratios of the precursor ions transmitted is varied as a function of time;
- fragment or react the precursor ions in the fragmentation or reaction device so as to produce fragment or product ions;
- periodically mass analyse the fragment or product ions at a plurality of consecutive time intervals;
- wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;
- wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;
- wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;
- determine a peak for each of the different fragment or product ions including at least the first, second and third summed intensities represented as a function of their associated first T1, second T2 and third T3 times;

determine an average or centroid time value for each peak that represents an average or centroid time at which the fragment or product ion is considered to have been analysed; and use the average or centroid time for each fragment or product ion to identify its respective precursor ion.

The fourth aspect of the present invention also provides a mass or ion mobility spectrometer comprising:

a device for selectively transmitting ions according to a physicochemical property;

a fragmentation or reaction device;

a mass analyser; and control means arranged and configured to cause the mass spectrometer to transmit precursor ions through said device and into the fragmentation or reaction device, wherein a physicochemical property of the precursor ions transmitted is varied as a function of time;

fragment or react the precursor ions in the fragmentation or reaction device so as to produce fragment or product ions;

periodically mass analyse the fragment or product ions at a plurality of consecutive time intervals;

wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;

wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;

wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;

determine a peak for each of the different fragment or product ions including at least the first, second and third summed intensities represented as a function of their associated first T1, second T2 and third T3 times;

determine an average or centroid time value for each peak that represents an average or centroid time at which the fragment or product ion is considered to have been analysed; and use the average or centroid time for each fragment or product ion to identify its respective precursor ion.

The spectrometer disclosed herein may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage may have an amplitude selected from the group consisting of: (i)<50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage may have a frequency selected from the group consisting of: (i)<100 kHz; (ii) 100-200 kHz; (iii) 200-300 kHz; (iv) 300-400 KHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHZ; and (xxv) >10.0 MHz.

The spectrometer may comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

In order to effect Electron Transfer Dissociation, optionally either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms;

(v) caesium vapour or atoms; (vi) francium vapour or atoms; (vii) $C_{80}$ vapour or atoms; and (viii) magnesium vapour or atoms.

The multiply charged analyte cations or positively charged ions may comprise peptides, polypeptides, proteins or biomolecules.

In order to effect Electron Transfer Dissociation, optionally: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9'-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene reagent ions.

The techniques described herein provide an improved precursor ion mass accuracy to less than a digitisation bin width. This may be used to improve the mass to charge ratio accuracy of the precursor ion measurements in a two dimensional MSMS experiment.

BRIEF DESCRIPTION OF THE DRAWINGS

Various embodiments of the present invention will now be described, by way of example only, and with reference to the accompanying drawings in which.

DETAILED DESCRIPTION OF EMBODIMENTS OF INVENTION

Figure 1:
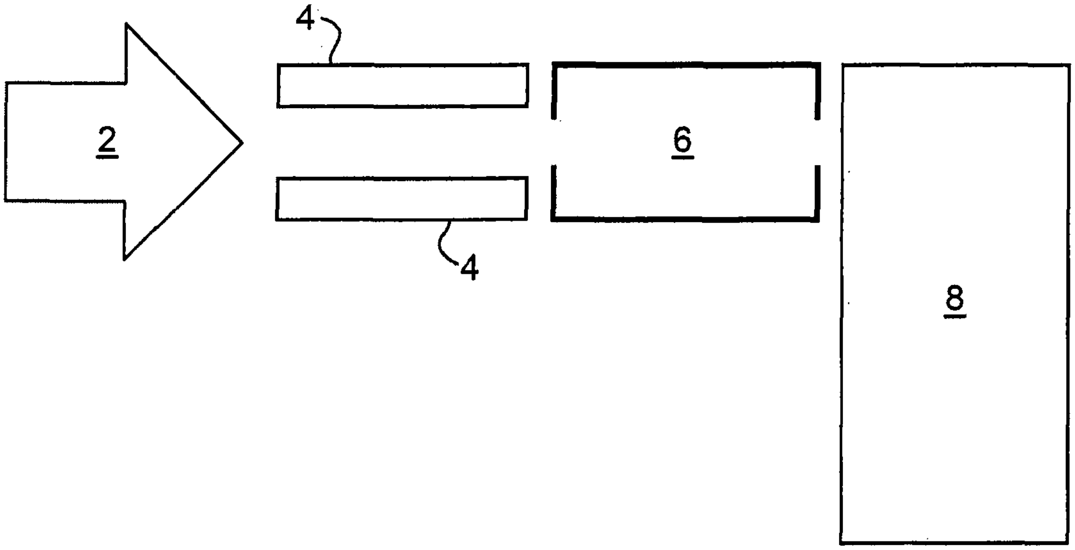
FIG. 1 shows a schematic of a mass spectrometer in accordance with the present invention.

FIG. 1 shows a schematic of an embodiment of a mass spectrometer according to the present invention. The mass spectrometer comprises a quadrupole mass filter 4, a gas cell 6 and an orthogonal acceleration Time-of-Flight mass analyser 8. During operation, the quadrupole mass filter 4 is set so as to have a relatively low resolution. For example, the quadrupole 4 may transmit precursor ions 2 within a transmission window having a width of 25 Da. Precursor ions 2 that are transmitted by the quadrupole mass filter 4 are accelerated into the gas cell 6 such that they fragment to produce fragment ions. These fragment ions are then mass analysed in the Time-of-Flight mass analyser 8.

A precursor experiment starts at T0 by transmitting precursor ions through the quadrupole mass filter 4. The quadrupole mass filter 4 is scanned with time during the experiment such that the range of mass to charge ratios transmitted in the transmission window of the quadrupole mass filter 4 changes with time. The quadrupole mass filter 4 scans in a non-biased, data independent manner so as to onwardly transmit precursor ions having a restricted range of mass to charge ratios. As described above, the precursor ions are then fragmented and the resulting fragment ions are mass analysed in the Time-of-Flight mass analyser 8. The Time-of-Flight mass analyser 8 operates by periodically pushing/pulsing fragment ions into a time of flight region. The fragments ions separate according to mass to charge ratio in the time of flight region and are then detected on a detector. The duration between an ion being pushed/pulsed and the ion being detected is determined and used to calculate the mass to charge ratio of the ion.

The precursor ion experiment is then repeated a plurality of times by scanning the quadrupole mass filter 4 a corresponding plurality of times.

The timing at which fragment ions are detected may be correlated to the timing of the transmission window in which their precursor ions 2 were transmitted by the mass filter 4. The gas cell 6 preferably maintains the fidelity of the temporally separated fragment ions by use of a travelling wave or a linear accelerating electric field.

The Time-of-Flight acquisition system operates so that multiple Time-of-Flight spectra may be combined and tagged with effective first dimensional time or an increment relative to some other start event. In the preferred embodiment the start event is the start of the quadrupole mass-to-charge ratio scan.

Method 1

Figure 2:
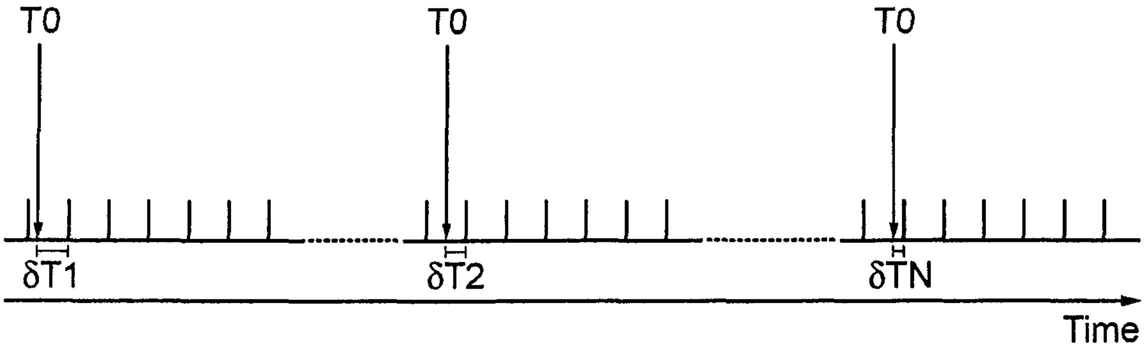
FIGS. 2 and 3 illustrate a first method in accordance with the present invention wherein the delay time between the start of an experiment and the analysis is varied.

FIG. 2 illustrates a first method in accordance with present invention. This method may be particularly advantageous where the precursor ions are separated by mass to charge ratio on relatively fast timescales, for example 1 to 100 milliseconds. FIG. 2 shows three diagrams of the timings of the extraction pulses of the Time of Flight mass analyser for three experiments, relative to the start time T0 of each experiment, i.e. the time at which ions begin to be transmitted by the quadrupole mass filter 4 in each experimental run. As can be seen, the time delay between two subsequent extraction pulses is constant. In the first experiment there is a first time delay, dt1, between the start of the experiment and the next extraction pulse of the Time of Flight mass analyser 8. In the second experiment there is a second time delay, dt2, between the start of the experiment and the next extraction pulse of the Time of Flight mass analyser 8. Time delay dt2 is smaller than time delay dt1. In the third experiment there is a third time delay, dt3, between the start of the experiment and the next extraction pulse of the Time of Flight mass analyser 8. Time delay dt3 is smaller than time delay dt1 and time delay dt2. Although only three experiments are shown, more than three experiments may be performed.

According to the method of FIG. 2, the first extraction pulse/push of the Time of Flight mass analyser after a precursor m/z separation experiment start time T0 is assigned a push/pulse number of n=1 and each push thereafter is assigned an increasing integer number up to N, where the integer N multiplied by the duration between subsequent pushes is greater than the precursor ion separation experiment time, i.e. greater than the time over which the quadrupole mass filter is scanned.

The data obtained by the Time of Flight mass analyser in the different experiments is integrated. The data obtained from push n=1 in each experiment is combined, the data obtained from push n=2 in each experiment is combined, the data from push n=3 in each experiment is combined and so on, up to push N. In other words, the data obtained from the nth push of any given experiment is combined with the data from the nth push of the other experiments. This provides a two dimensional data set, wherein the push number n effectively represents a time within the precursor ion separation experiment (i.e. a first dimension) and at each push number n an entire fragment ion mass to charge ratio spectrum is accessible and made up of combined data from multiple precursor ion experiments.

As described above, the Time of Flight acquisition timings are not synchronised with the precursor separation experiment start time T0, because push number n=1 is delayed from start time T0 by different amounts in different experiments. This means that it is likely that a particular push number, for example push number n=100, will sample slightly different parts of a mass peak in different experiments.

Figure 3:
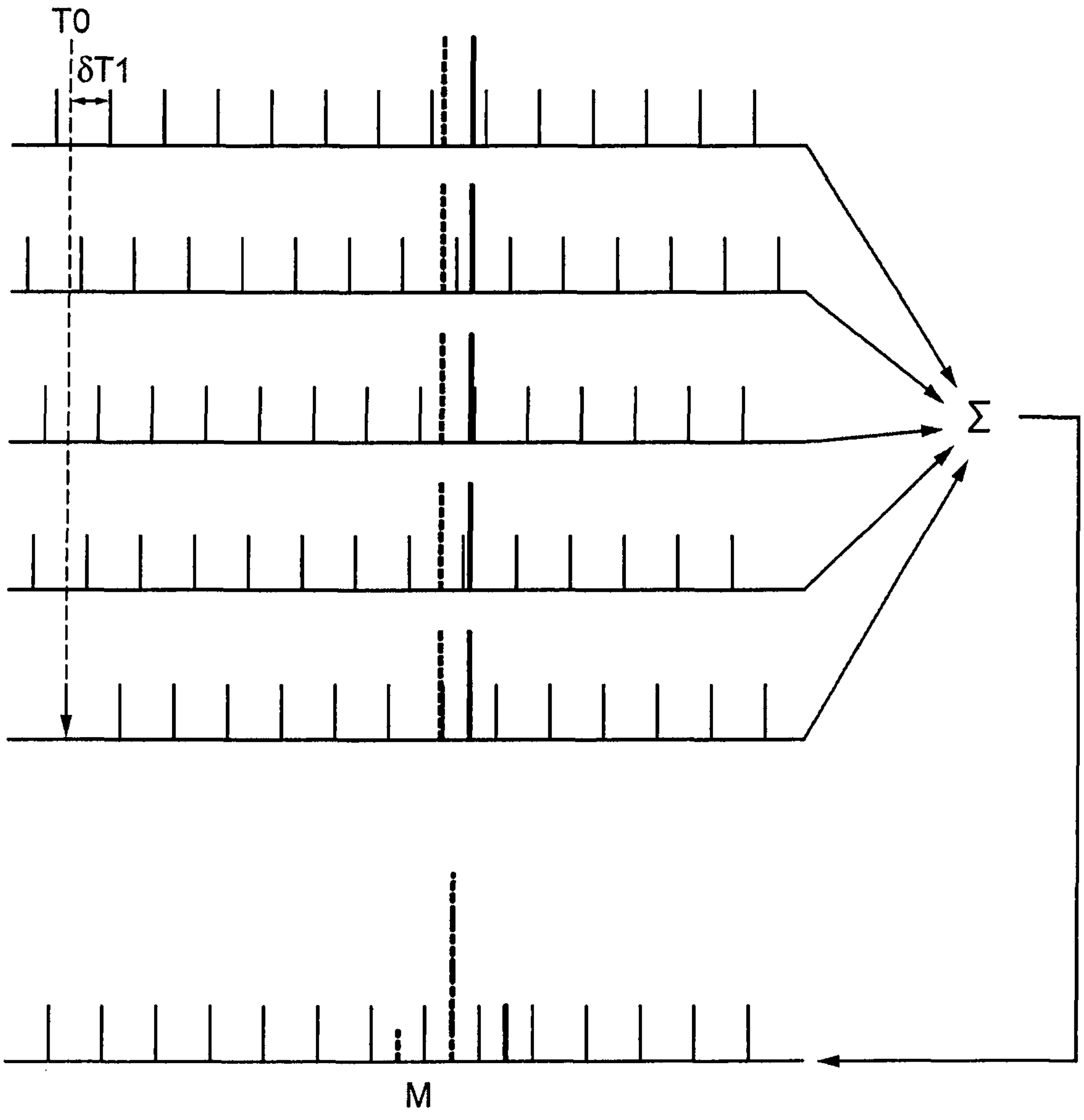

FIG. 3 helps illustrate the advantage of the method described above and shows the experiments stacked vertically and aligned by the start time T0 of each experiment, rather than shown horizontally in time as in FIG. 2. Five experiments are shown in FIG. 3, wherein the delay time between the start of the experiment T0 and the first push n=1 is different in each experiment. The length of the time delay desirably varies randomly between the different experiments (although the time delay has a duration less than the duration between two subsequent pulses). A first component and second component are analysed by the Time of Flight mass analyser in each experiment. The two components are received at the Time of Flight mass analyser separated by a time that is less than the duration between two subsequent pusher periods. As such, in some experiments the two components are analysed by the Time of Flight mass analyser in the same push, as can be seen in the first, third and fifth experiments. However, because the delay time between the start of the experiment T0 and the first push differs in each experiment, a push time falls between the two components in some of the experiments and so the two components are analysed in different pushes in these experiments, as can be seen in the second and fourth experiments in FIG. 3. When the data from the different experiments is combined this allows separation of the two components in the final data; as in some of the experiments a first of the components is analysed in the Mth push and in other experiments the first component is analysed in the (M−1)th push, and in some of the experiments the second component is analysed in the Mth push and in other experiments the second component is analysed in the (M+1)th push. This is shown by the summed plot at the bottom of FIG. 3. Combining many of the experiments together allows an accurate determination of the precursor mass.

The embodiment described above is in contrast to the conventional way of acquiring data.

Figure 4:
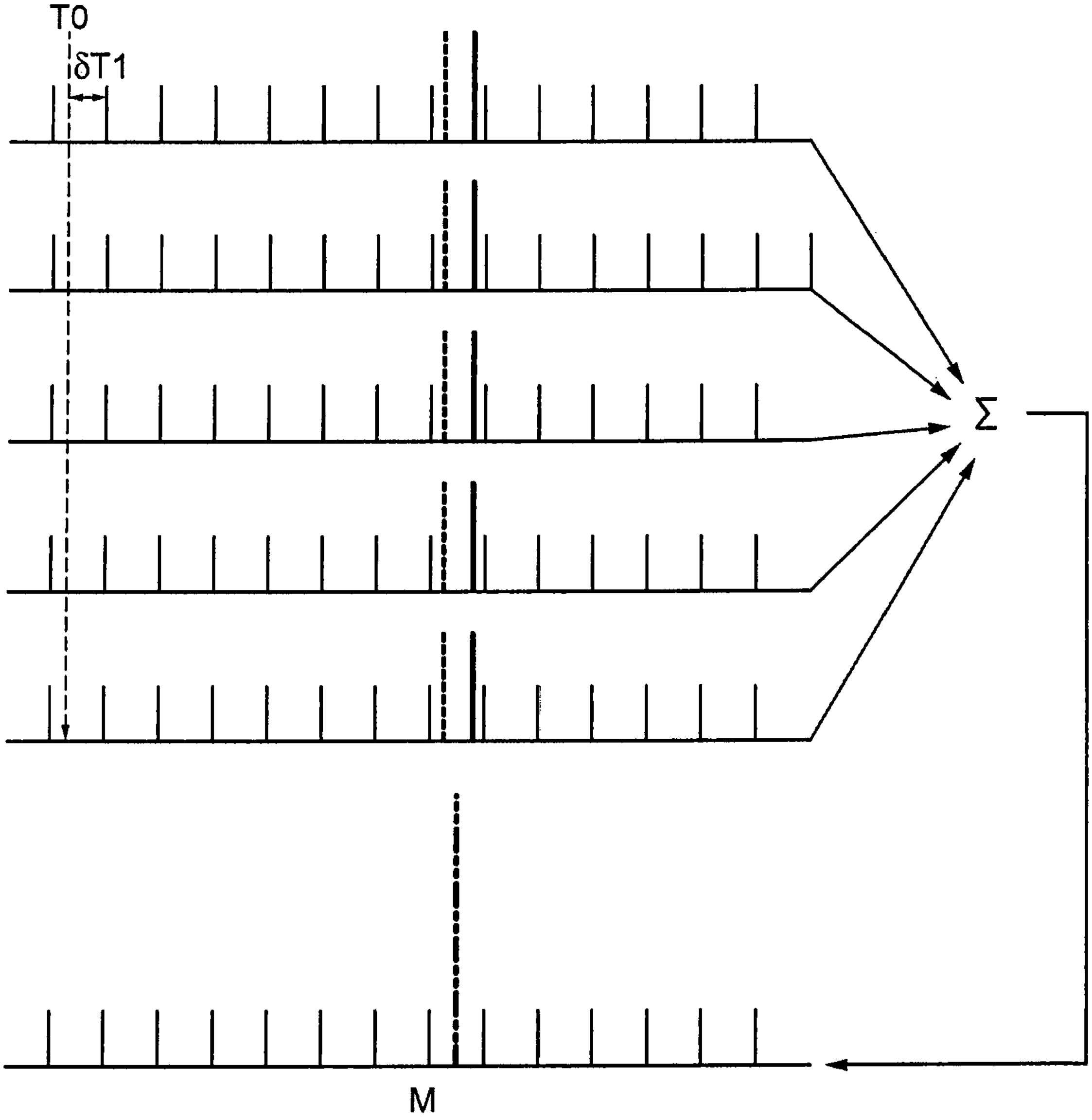
FIG. 4 illustrates a conventional method wherein the delay time between the start of an experiment and the analysis is constant.

FIG. 4 shows plots corresponding to those in FIG. 3, except wherein the data is acquired in a conventional manner. As shown in FIG. 4, the Time of Flight acquisition system is synchronised with the experimental start time T0 such that the time delay between the start time T0 and the first push of the time of Flight mass analyser is constant in each of the different experiments. Consequently, the two components always fall in the same bin and are analysed by the same push number (push M) in each experiment. This renders the two components inseparable in the final combined data, as shown in the lowermost plot of FIG. 4.

It is possible to improve the synchronised approach shown in FIG. 4 by synchronising the experimental start time T0 with the acquisition system, but such that the time delay between the start time T0 and the first push of the time of Flight mass analyser is different in different experiments. Varying the delay time between T0 and push number 1 by a known amount and taking account of this known amount during the combining process enables the two components to be assigned to separate bins in at least some of the experiments. This would result in greater than N total bins or push numbers, effectively improving the digitisation. However, this approach is less preferred than the described in relation to FIG. 3 as it requires additional instrument control and increases the two-dimensional data file sizes.

The approach described in relation to FIG. 4 having different delay times differs from the approach described in relation to FIG. 3, in that in FIG. 3 the time delay between the start time T0 and the first push of the time of Flight mass analyser is random and unsynchronised with the acquisition system.

Method 2

Figure 5:
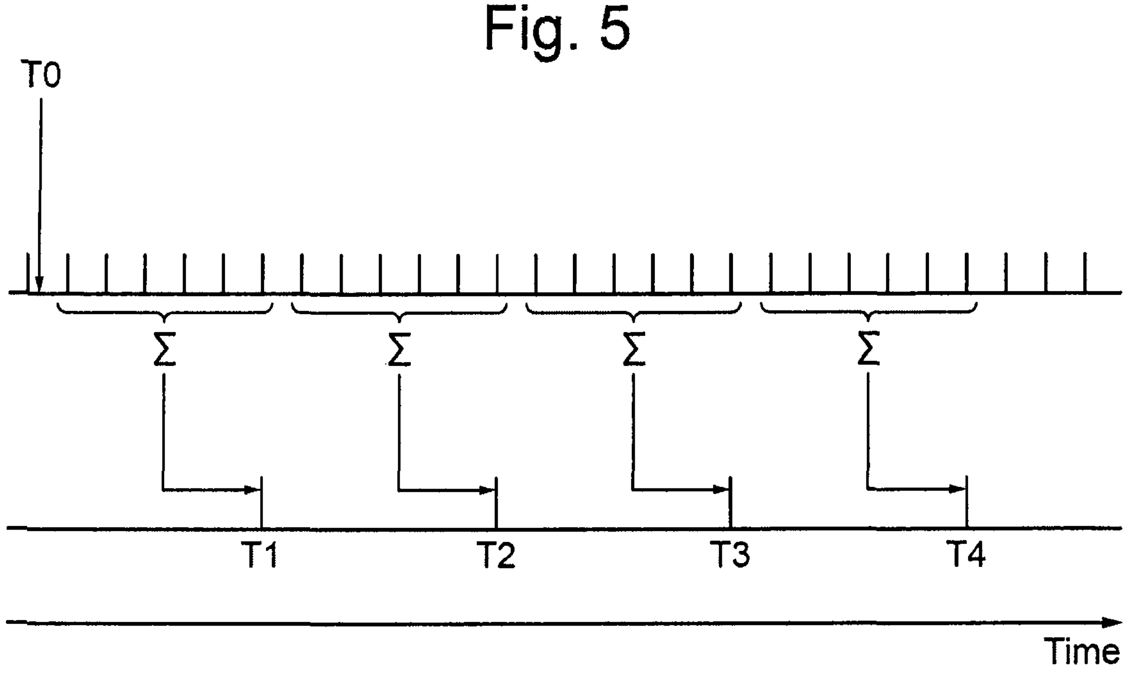
FIGS. 5 and 6 illustrate a second method in accordance with the present invention.

FIG. 5 illustrates another method in accordance to the present invention. This method may be particularly advantageous where the precursor ions are separated by mass to charge ratio on relatively fast timescales, for example 50 to greater than 1000 milliseconds.

FIG. 5 shows a plot of the Time of Flight mass analyser pushes relative to the start time T0 of a precursor ions experiment. The duration between any two subsequent pushes is constant. According to this method, the data obtained from multiple consecutive pushes is combined, summed, averaged or integrated so as to produce less frequent data points or bins. In the example shown in FIG. 5, data from the first six pushes is combined to form data at time T1, where time T1 corresponds to the time of the sixth push. Data from the next six pushes is combined to form data at time T2, where time T2 corresponds to the time of the twelfth push. Data from the next six pushes is combined to form data at time T3, where time T3 corresponds to the time of the eighteenth push. Data from the next six pushes is combined to form data at time T4, where time T4 corresponds to the time of the twenty-fourth push.

It is noteworthy that adjacent pushes or ToF spectra may be combined into different final bins, unlike traditional acquisition systems where different combined spectra are separated by the many pushes associated with instrument interscan times or delays. This improves the duty cycle of the system as a whole.

Figure 6:
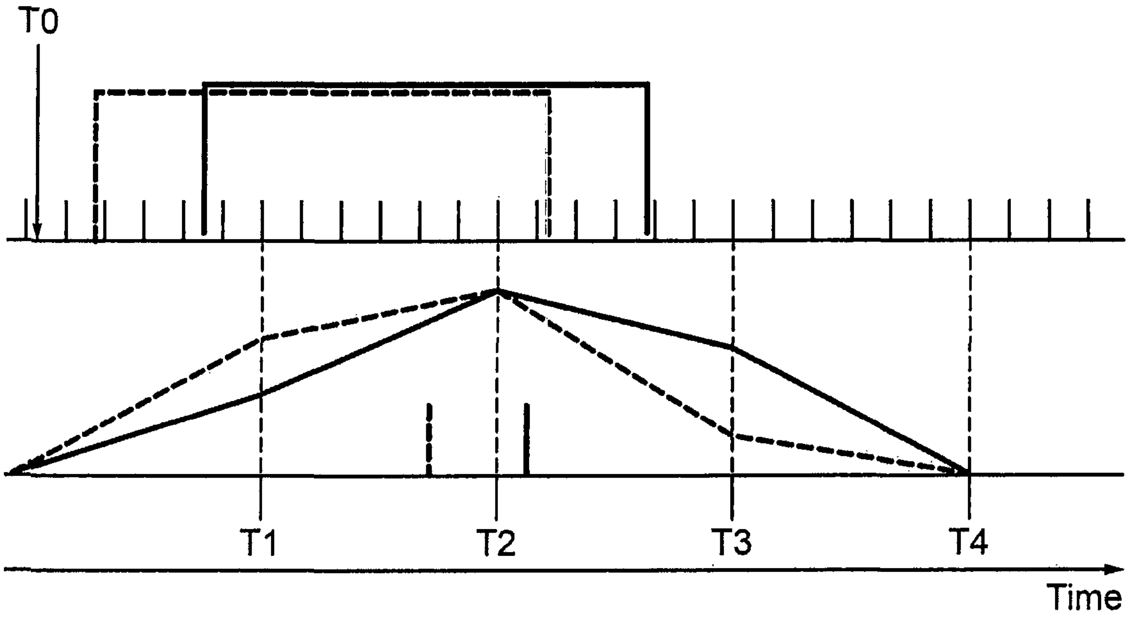

FIG. 6 illustrates how two components that populate the same time bins in FIG. 5 can be separated. The upper plot in FIG. 6 shows two partially overlapping rectangles that represent two equal intensity components being received over partially overlapping time periods. A first component begins to be received between the first and second pushes, and stops being received between the thirteenth and fourteenth pushes. A second component begins to be received between the fourth and fifth pushes, and stops being received between the fifteenth and sixteenth pushes. It is desired to identify the centroids or weighted average times of the two components.

The lower plot in FIG. 6 illustrates how discrete times (e.g. centroids or weighted average times) for the two components can be determined even though the first and second components arrive within same six pushes that are summed to form data at time T1. The plotted points in the lower plot of FIG. 6 at each of time T0, T1, T2, T3 and T4 represent the summed responses for each component between the previous output time bin and the current one. For example, the response for each component at bin time T1 equates to the sum of the data from the upper plot in FIG. 6 between times T0 and T1 (i.e. from the first 6 pushes). The second component is only present for a short initial period between times T0 and T1, and so returns a relatively low value at T1. In contrast, the first component is present for a relatively long time between times T0 and T1, and so returns a relatively high value at T1. The response at bin time T2 equates to the sum of the data from the upper plot of FIG. 6 between times T1 and T2 (i.e. from the seventh to twelfth pushes). As both the first and second components are present for the full duration between T1 and T2 they return the same response. The response at bin time T3 equates to the sum of the data from the upper plot of FIG. 6 between times T2 and T3 (i.e. from the thirteenth to eighteenth pushes). The first component is only present for a short initial period between times T2 and T3, and so returns a relatively low value at T3. In contrast, the second component is present for a relatively long time between times T2 and T3, and so returns a relatively high value at T3. The response at bin time T4 equates to the sum of the data from the upper plot of FIG. 6 between times T3 and T4 (i.e. from the nineteenth to twenty-fourth pushes). Neither of the components is present between times T3 and T4 and so both components return a value of zero at T4.

Once the peak for each component has been detected and its boundaries have been established, a discrete time (e.g. a centroid or weighted average time) can be determined for the component. For example, the weighted average time may be determined via the equation below, where $T_k$ is the time bin and $I_k$ is the intensity value in the corresponding bin. The intensity is just the sum of all the individual bin intensities across the detected peak.

$$\overline{T} = \frac{\sum_{k=1}^{n} T_k \times I_k}{\sum_{k=1}^{n} I_k}$$

The integrating/summing approach of the acquisition system described in relation to the lower plot in FIG. 6 provides peaks for the two components that have different profiles at the leading and trailing edges, because the components are detected over different (overlapping) time periods. A weighted average can be determined for each peak so as to determine a distinct and correct time measurement for each component (ignoring the systematic shift due to the time assignment in FIGS. 5 and 6), despite the fact that the two components populate the same time bins. The distinct time measurements are shown in the lower plot of FIG. 6 as vertical lines on either side of time T2. These distinct time measurements can be converted into mass to charge ratios for the components.

The integrating/summing technique of the preferred embodiment is in contrast to simply sampling the data at less frequent intervals. If the data was merely measured and acquired the data at the four time points T1, T2, T3 and T4 then the response for each component would be the same in each bin, and it would not be possible to determine discrete times for each component.

The technique described in relation to FIGS. 5 and 6 enables the amount of data acquired to be reduced. For example, ideally the data from each of the pushes would be kept separate by having a sampling rate that is the same as the pusher rate. However, such pusher rates can be over 20,000 times per second, which would result in a vast amount of data. The approach described in relation to FIGS. 5 and 6 enables a reduced number of data points and reduced file sizes, whilst retaining some of the benefits associated with a fast sampling rate corresponding to the pusher rate.

As shown in FIG. 6, the approach is particularly useful for systems where the rise/fall time of the precursor profiles is less than the first dimensional bin width (i.e. time bin), which is a likely issue with devices such as lower resolution scanning quadrupoles.

In the method described in relation to FIGS. 5 and 6, the ToF acquisition system may operate either asynchronously or synchronously with the start time T0 of the precursor separation experiment.

Although the present invention has been described with reference to preferred embodiments, it will be understood by those skilled in the art that various changes in form and detail may be made without departing from the scope of the invention as set forth in the accompanying claims.

For example, the embodiments have been described in terms of scanning a low resolution quadrupole in order to separate the precursor ions according to mass to charge ratio (i.e. a first dimensional separator). However, it is contemplated that alternative mass to charge ratio separators may be used such as, for example, ion traps, magnetic sectors and Time of Flight separators. It is contemplated that ion separators other than mass to charge ratio separators may be used, such as an ion mobility separator.

The separator for separating the fragment ions (second dimensional separator) has been described in terms of a Time of Flight mass analyser. However, although less preferred due to typically slower timescales, the separator may be a separator or mass analyser other than a ToF mass analyser.

In both methods the acquisition system produces a two dimensional data set with both dimension being m/z, one dimension precursor m/z and the other dimension fragment ion m/z. The orthogonal relationship between precursor ion m/z & fragment ion m/z allows precursor ion mass spectra to be effectively reproduced from fragment ion data.

The choice of which of the two methods is used may depend on the timescales associated with the precursor ion separation in the first dimension and the timescales associated with ToF separation.

In both methods the approach can be combined with un-fragmented precursor ion measurements scans and/or ToFMS.

The invention claimed is:

1. A method of mass spectrometry comprising:

mass selectively transmitting precursor ions into a fragmentation or reaction device, wherein the mass to charge ratios of the precursor ions transmitted is varied as a function of time;

fragmenting or reacting the precursor ions in the fragmentation or reaction device so as to produce fragment or product ions;

periodically mass analysing the fragment or product ions at a plurality of consecutive time intervals;

wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;

wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;

wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;

determining a peak for each of the different fragment or product ions including at least the first, second and third summed intensities represented as a function of their associated first T1, second T2 and third T3 times;

determining an average or centroid time value for each peak that represents an average or centroid time at which the fragment or product ion is considered to have been analysed; and using the average or centroid time for each fragment or product ion to identify its respective precursor ion.

2. The method of claim 1, wherein the average or centroid time for a first of said different fragment or product ions is used to determine the time at which its precursor ion was transmitted into the fragmentation or reaction device, and wherein the time at which its precursor ion was transmitted is used to determine the mass to charge ratio of the precursor ion; and/or wherein the average or centroid time for a second of said different fragment or product ions is used to determine the time at which its precursor ion was transmitted into the fragmentation or reaction device, and wherein the time at which its precursor ion was transmitted is used to determine the mass to charge ratio of the precursor ion.

3. The method of claim 1, wherein a first of said different fragment or product ions is mass analysed during a plurality of first consecutive time intervals, wherein a second of said different fragment or product ions is mass analysed during a plurality of second consecutive time intervals, and wherein the first and second consecutive time intervals partially overlap such that only some of the time intervals in the first and second consecutive time intervals are the same time intervals and some of the time intervals in the first and second consecutive time intervals are non-overlapping time intervals; and optionally;

wherein said first plurality of consecutive time intervals occurring between said start time T0 and said first time T1 includes at least some of said same time intervals and at least some of said non-overlapping time intervals; and/or wherein said second plurality of consecutive time intervals occurring between said first time T1 and said second time T2 includes at least some of said same time intervals and/or at least some of said non-overlapping time intervals; and/or wherein said third plurality of consecutive time intervals occurring between said second time T2 and said third time T3 includes at least some of said same time intervals and/or at least some of said non-overlapping time intervals.

4. The method of claim 1, wherein for each of the different types of fragment or product ions, the intensities of the spectral data obtained in a fourth plurality of consecutive time intervals occurring between the third time T3 and a fourth later time T4 are summed so as to determine a fourth summed intensity for each fragment or product ion that is associated with fourth time T4; and wherein said step of determining a peak comprises determining a peak for each of the different fragment or product ions including the first, second, third and fourth summed intensities represented as a function of their associated first T1, second T2, third T3 and fourth T4 times.

5. The method of claim 1, wherein the step of determining an average or centroid time value for each peak comprises determining a weighted average time of said peak.

6. The method of claim 1, wherein said first and/or second and/or third and/or fourth plurality of consecutive time intervals comprises ≥x time intervals, wherein x is selected from the group consisting of: 2, 3, 4, 5, 6, 7, 8, 9, 10, 15 or 20.

7. The method of claim 1, wherein the time intervals are regular time intervals.

8. The method of claim 1, wherein said different fragment or product ions have different mass to charge ratios.

9. The method of claim 1, wherein the fragment or product ions are analysed by a time of flight mass analyser that periodically pulses the fragment or product ions into a time of flight region, and wherein the durations between subsequent ones of said pulses correspond to said plurality of time intervals.

10. The method of claim 1, wherein the precursor ions are mass selectively transmitted to the fragmentation of reaction device by a mass filter or quadrupole rod set.

11. A method of mass or ion mobility spectrometry comprising:

transmitting precursor ions into a fragmentation or reaction device, wherein a physicochemical property of the precursor ions transmitted is varied as a function of time fragmenting or reacting the precursor ions in the fragmentation or reaction device so as to produce fragment or product ions;

periodically mass analysing the fragment or product ions at a plurality of consecutive time intervals;

wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;

wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;

wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;

determining a peak for each of the different fragment or product ions including at least the first, second and third summed intensities represented as a function of their associated first T1, second T2 and third T3 times;

determining an average or centroid time value for each peak that represents an average or centroid time at which the fragment or product ion is considered to have been analysed; and using the average or centroid time for each fragment or product ion to identify its respective precursor ion.

12. The method of claim 11, wherein the precursor ions are transmitted to said fragmentation or reaction device by an ion mobility separator, and wherein said physicochemical property is ion mobility.

13. A mass spectrometer comprising:
a device for mass selectively transmitting ions;
a fragmentation or reaction device;
a mass analyser; and
control means arranged and configured to cause the mass spectrometer to mass selectively transmit precursor ions through said device and into the fragmentation or reaction device, wherein the mass to charge ratios of the precursor ions transmitted is varied as a function of time;
fragment or react the precursor ions in the fragmentation or reaction device so as to produce fragment or product ions;
periodically mass analyse the fragment or product ions at a plurality of consecutive time intervals;
wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;
wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;
wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;
determine a peak for each of the different fragment or product ions including at least the first, second and third summed intensities represented as a function of their associated first T1, second T2 and third T3 times;
determine an average or centroid time value for each peak that represents an average or centroid time at which the fragment or product ion is considered to have been analysed; and
use the average or centroid time for each fragment or product ion to identify its respective precursor ion.

14. A mass or ion mobility spectrometer comprising:
a device for selectively transmitting ions according to a physicochemical property;
a fragmentation or reaction device;
a mass analyser; and
control means arranged and configured to cause the mass spectrometer to transmit precursor ions through said device and into the fragmentation or reaction device, wherein a physicochemical property of the precursor ions transmitted is varied as a function of time;
fragment or react the precursor ions in the fragmentation or reaction device so as to produce fragment or product ions;
periodically mass analyse the fragment or product ions at a plurality of consecutive time intervals;
wherein for each of a plurality of different types of fragment or product ions, the intensities of the spectral data obtained in a first plurality of consecutive time intervals occurring between a start time T0 and a first time T1 are summed so as to determine a first summed intensity for each fragment or product ion that is associated with first time T1;
wherein for each of the different types of fragment or product ions, the intensities of the spectral data obtained in a second plurality of consecutive time intervals occurring between the first time T1 and a second later time T2 are summed so as to determine a second summed intensity for each fragment or product ion that is associated with second time T2;
wherein for each of the different types of fragment or product ions, the intensities of the spectral data obtained in a third plurality of consecutive time intervals occurring between the second time T2 and a third later time T3 are summed so as to determine a third summed intensity for each fragment or product ion that is associated with third time T3;
determine a peak for each of the different fragment or product ions including at least the first, second and third summed intensities represented as a function of their associated first T1, second T2 and third T3 times;
determine an average or centroid time value for each peak that represents an average or centroid time at which the fragment or product ion is considered to have been analysed; and
use the average or centroid time for each fragment or product ion to identify its respective precursor ion.

* * * * *